(12) United States Patent
Ogawa (10) Patent No.: US 12,141,858 B2
(45) Date of Patent: Nov. 12, 2024

(54) NON-TRANSITORY COMPUTER-READABLE RECORDING MEDIUM STORING COMPUTER READABLE INSTRUCTIONS FOR TERMINAL DEVICE, TERMINAL DEVICE, AND METHOD FOR CONTROLLING THE TERMINAL DEVICE

(71) Applicant: BROTHER KOGYO KABUSHIKI KAISHA, Nagoya (JP)

(72) Inventor: Kazuaki Ogawa, Ichinomiya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/469,736

(22) Filed: Sep. 19, 2023

(65) Prior Publication Data

US 2024/0104637 A1 Mar. 28, 2024

(30) Foreign Application Priority Data

Sep. 22, 2022 (JP) .................. 2022-151129

(51) Int. Cl.
*G06Q 30/0601* (2023.01)
*G06F 3/12* (2006.01)

(52) U.S. Cl.
CPC ....... *G06Q 30/0641* (2013.01); *G06F 3/1204* (2013.01); *G06F 3/1229* (2013.01); *G06F 3/1288* (2013.01)

(58) Field of Classification Search
CPC ............. G03G 15/502; G03G 15/5079; G03G 15/553; G03G 2215/00109; G06F 3/121; G06F 3/1235; G06F 3/1219; G06F 3/1285; G06F 3/1286; G06F 3/1289; G06Q 10/083; G06Q 10/20; G06Q 30/06; G06Q 30/0601; H04N 1/00363; H04N 1/00954
USPC ....................................... 358/1.15
See application file for complete search history.

(56) References Cited

U.S. PATENT DOCUMENTS

| 5,892,900 A * | 4/1999 | Ginter ............... H04L 63/20 726/26 |
| 11,985,278 B2 * | 5/2024 | Shiotani ........... H04N 1/00427 |
| 2006/0161658 A1 | 7/2006 | Noguchi |
| 2007/0188530 A1 * | 8/2007 | Garrana ........... B41J 2/17533 347/7 |

(Continued)

FOREIGN PATENT DOCUMENTS

| JP | 2005059303 A | 3/2005 |
| JP | 2020-052566 A | 4/2020 |

(Continued)

*Primary Examiner* — Negussie Worku
(74) *Attorney, Agent, or Firm* — Scully, Scott, Murphy & Presser, P.C.

(57) ABSTRACT

Disclosed herein is a non-transitory computer-readable recording medium storing computer-readable instructions for a terminal device. The computer-readable instructions, when executed by a processor of the terminal device, may cause the terminal device to: display a predetermined screen related to a printing device on a display unit of the terminal device; and in a case where a predetermined instruction for purchasing a consumable article for the printing device is received from a user while the predetermined screen is displayed on the display unit, display service-related information related to a service provided by a vendor of the printing device on the display unit.

20 Claims, 8 Drawing Sheets

(56) References Cited

U.S. PATENT DOCUMENTS

| | | | |
|---|---|---|---|
| 2012/0002239 A1* | 1/2012 | Okamura | G06K 15/402 |
| | | | 715/810 |
| 2012/0120437 A1* | 5/2012 | Nanaumi | G06F 3/1288 |
| | | | 358/1.15 |
| 2014/0253939 A1* | 9/2014 | Hashimoto | G06F 3/1204 |
| | | | 358/1.13 |
| 2018/0182392 A1* | 6/2018 | Li | H04R 1/406 |
| 2020/0064766 A1* | 2/2020 | Ushinohama | G06F 3/1224 |
| 2020/0096928 A1 | 3/2020 | Moriya | |
| 2020/0225885 A1 | 7/2020 | Akimoto et al. | |
| 2021/0055893 A1* | 2/2021 | Saigusa | G06F 3/1208 |
| 2021/0314461 A1* | 10/2021 | Hatada | G06F 3/1224 |
| 2022/0174178 A1* | 6/2022 | Okamoto | H04N 1/00307 |
| 2022/0236934 A1* | 7/2022 | Matsushima | G06F 3/126 |
| 2024/0040054 A1* | 2/2024 | Kato | H04N 1/00477 |

FOREIGN PATENT DOCUMENTS

| | | |
|---|---|---|
| JP | 2020111023 A | 7/2020 |
| JP | 2020175594 A | 10/2020 |

\* cited by examiner

FIG. 1

Communication System 2

FIG. 3
(Printer Registration Sequence)

(First Embodiment)

SC5 — 350
Would you like to subscribe to cartridge automatic shipping service?
C:80% ☐
M:20% ☐
Y:70% ☐
K:30% ☐
[Confirmation]

SC6
C:80% ☐
M:20% ☐
Y:70% ☐
K:30% ☐
[Confirmation]

SC7
To customers wishing to subscribe to automatic shipping service
Please fill in the following entry fields.
Name ________
Address ________
Telephone Number ________
Payment Method ________
[NEXT]

SC8
Automatic shipping service is a service of automatically shipping a new cartridge when the remaining amount in the current cartridge becomes low. [NEXT]

Flat-rate printing service is a service that allows you to print up to the maximum number of sheets for a fixed monthly fee. [NEXT]

(Second Embodiment)

SC10 — 360
Point Rewards Service Underway
C:80% ☐
M:20% ☐
Y:70% ☐
K:30% ☐
[Confirmation]

SC11
To customers wishing to subscribe to point rewards service
Please fill in the following items.
Name ________
Address ________
Telephone Number ________
Payment Method ________
[NEXT]

SC12
Automatic shipping service is a service of automatically shipping a new cartridge when the remaining amount in the current cartridge becomes low. [NEXT]

Point rewards service is a service of granting points usable for the next purchase to those who have purchased cartridges. [NEXT]

FIG. 7

NON-TRANSITORY COMPUTER-READABLE RECORDING MEDIUM STORING COMPUTER READABLE INSTRUCTIONS FOR TERMINAL DEVICE, TERMINAL DEVICE, AND METHOD FOR CONTROLLING THE TERMINAL DEVICE

REFERENCE TO RELATED APPLICATION

This application claims priority to Japanese Patent Application No. 2022-151129 filed on Sep. 22, 2022. The entire content of the priority application is incorporated herein by reference.

BACKGROUND ART

A terminal device which accesses a service providing server device by using a support service URL and displays a support service screen related to a printer is known. The support service screen is a screen for purchasing an ink tank to be mounted in the printer.

SUMMARY

The disclosure herein discloses technology that provides useful information to a user of a printing device.

A non-transitory computer-readable recording medium storing computer-readable instructions for a terminal device is disclosed herein. The computer-readable instructions, when executed by a processor of the terminal device, may cause the terminal device to: display a predetermined screen related to a printing device on a display unit of the terminal device; and in a case where a predetermined instruction for purchasing a consumable article for the printing device is received from a user while the predetermined screen is displayed on the display unit, display service-related information related to a service provided by a vendor of the printing device on the display unit.

According to the configuration above, the terminal device displays the service-related information when receiving the predetermined instruction for purchasing a consumable article for the printing device. Therefore, a user is able to know the information related to the service provided by the vendor of the printing device. Thus, the terminal device can provide useful information to the user of the printing device.

The terminal device itself and a method for controlling the terminal device are also novel and useful.

FIRST EMBODIMENT

Figure 1:
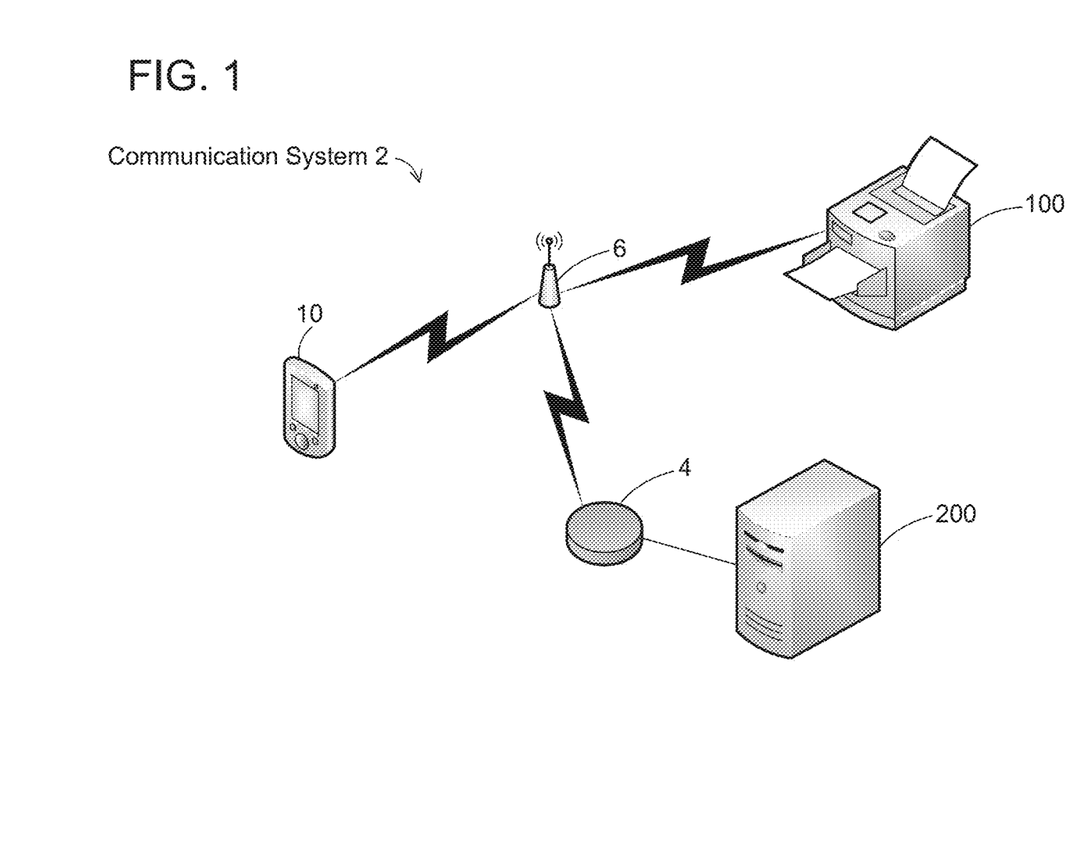
FIG. 1 illustrates a schematic configuration of a communication system.

Configuration of Communication System 2; FIG. 1

Description

A communication system 2 comprises a terminal 10, a printer 100, and a server 200. In the present embodiment, a user can access the server 200 by using the terminal 10 and perform an operation for purchasing ink cartridge(s) to be mounted in the printer 100. In this case, information related to a service provided by the vendor of the printer 100 is displayed at the terminal 10. Hereinafter, a cartridge will be abbreviated as "CTG".

The terminal 10 and the printer 100 are connected to an access point (abbreviated as "AP" hereinafter) 6. Therefore, the terminal 10 and the printer 100 are communicable with each other via the AP6. Further, the terminal 10 can connect to the Internet 4 via the AP 6. The terminal 10 may connect to the Internet 4 without the intervention of the AP 6. For example, the terminal 10 may connect to the Internet 4 through cellular communication of 4G, 5G, etc. The server 200 is connected to the Internet 4. Therefore, the terminal 10 is communicable with the server 200 via the Internet 4.

Figure 2:
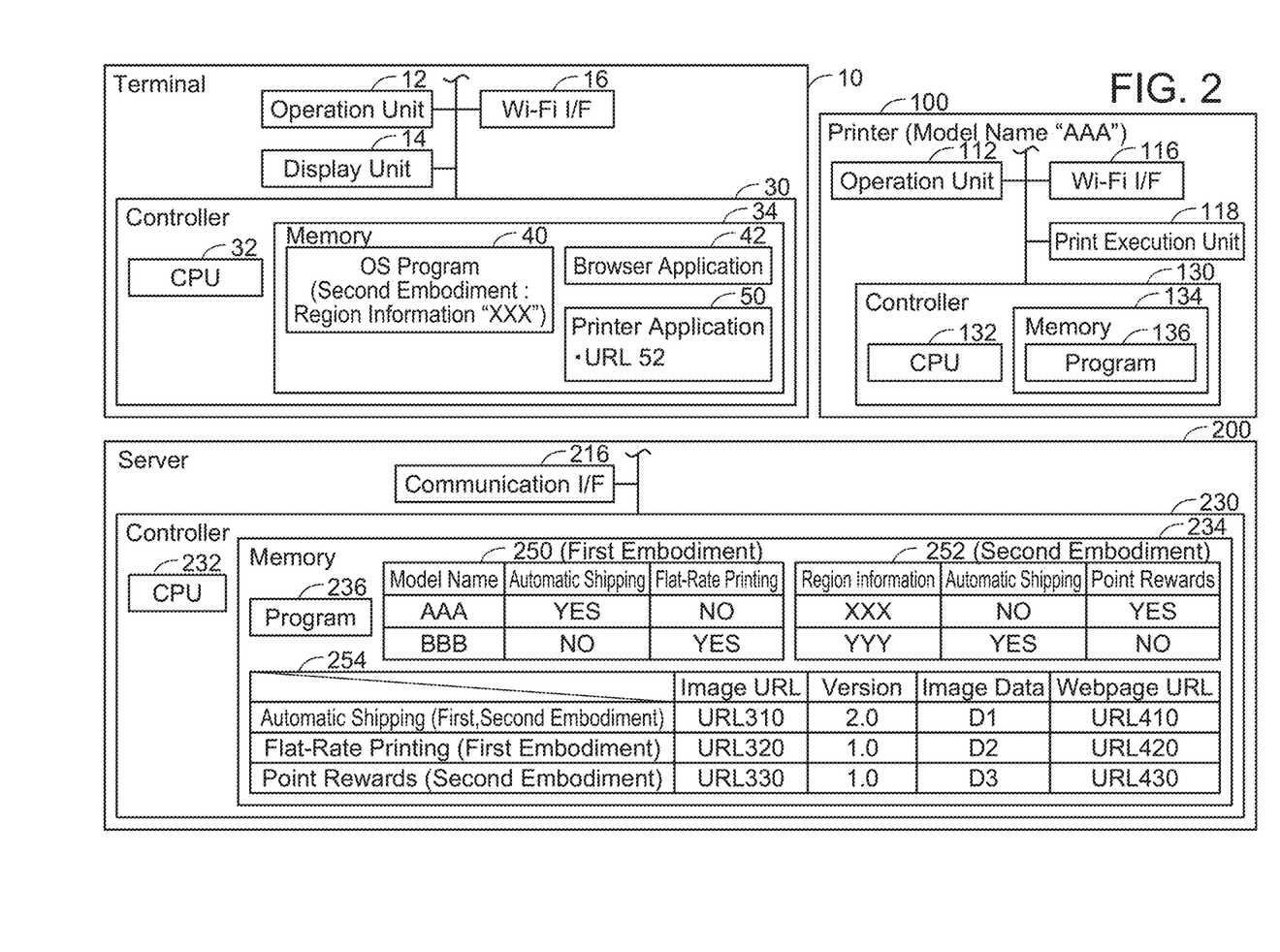
FIG. 2 illustrates hardware configurations of devices.

(Configuration of Terminal 10: FIG. 2)

With reference to FIG. 2, hardware configurations of the devices 10, 100, 200 are described. The terminal 10 is a mobile phone (e.g., a smartphone). In a modification, the terminal 10 may be another mobile terminal device such as a PDA, a tablet PC, or the like. In another modification, the terminal 10 may be a stationary terminal device.

The terminal 10 comprises an operation unit 12, a display unit 14, a Wi-Fi interface 16, and a controller 30. Although not illustrated, the terminal 10 may further comprise an interface for cellular communication of 4G, 5G, etc. The units 12 to 30 are connected to a bus line (reference sign omitted). Hereinafter, an interface may be abbreviated as "I/F".

The operation unit 12 comprises a plurality of buttons. The user can input various instructions to the terminal 10 by operating the operation unit 12. The display unit 14 is a display for displaying various information. The display unit 14 further serves as a so-called touch screen (i.e., as an operation unit). The Wi-Fi I/F 16 is an interface for establishing a wireless connection with the AP 6.

The controller 30 comprises a CPU 32 and a memory 34. The CPU 32 executes various processes according to programs 40, 42, 50 stored in the memory 34. The memory 34 is configured of a volatile memory, a non-volatile memory, etc. The memory 34 stores an OS (operating system) program 40, a browser application 42, and a printer application 50. Hereinafter, an application may be abbreviated as "app".

The OS program 40 is a program for implementing basic operations of the terminal 10 and is, for example, iOS (registered trademark), Android (registered trademark), or the like. The OS program 40 is preinstalled in the memory 34 of the terminal 10 before the terminal 10 is shipped.

The browser app 42 is a program for accessing a web server (e.g., the server 200) on the Internet for browse of a webpage. The browser app 42 is preinstalled in the memory 34 of the terminal 10 before the terminal 10 is shipped. The browser app 42 is a general web browser application such as Microsoft Edge (registered trademark) and is generally provided by a software vendor different from the vendor of the printer 100. The technology according to the present embodiment is not limited to display of a webpage by the browser app 42. For example, a webpage may be displayed by a Web View function the printer app 50 has.

The printer app 50 is a program for causing the printer 100 to execute printing. The printer app 50 is provided by the vendor of the printer 100 and is installed to the terminal 10 after the terminal 10 was shipped. The printer app 50 has a Uniform Resource Locator (URL) 52 in advance. The URL 52 is location information of screen data representing screens related to services (e.g., automatic shipping service, flat-rate printing service) provided by the vendor of the printer 100.

(Configuration of Printer 100)

The printer 100 is a peripheral device (e.g., a peripheral device of the terminal 10) configured to execute a print function. It suffices for the printer 100 to have at least the print function, and the printer 100 may be a multifunctional device having a scan function, a facsimile function, etc. The printer 100 has a model name "AAA".

The printer 100 comprises an operation unit 112, a Wi-Fi I/F 116, a print execution unit 118, and a controller 130. The units 112 to 130 are connected to a bus line (reference sign omitted).

The operation unit 112 comprises a plurality of buttons. The user can input various instructions to the printer 100 by operating the operation unit 112. The Wi-Fi I/F 116 is an interface for establishing a wireless connection with the AP 6. In the present embodiment, the print execution unit 118 comprises a print mechanism of inkjet scheme. Ink CTGs that contain inks in four colors, namely CMYK (cyan, magenta, yellow, black), respectively, are removably mounted in the print execution unit 118. The print execution unit 118 can execute color printing by using the inks in four colors of CMYK. In a modification, the print execution unit 118 may comprise a print mechanism of another scheme, such as an electrophotographic scheme, a thermal scheme, or the like.

The controller 130 comprises a CPU 132 and a memory 134. The CPU 132 executes various processes according to a program 136 stored in the memory 134. The memory 134 is configured of a volatile memory, a non-volatile memory, etc.

(Configuration of Server 200)

The server 200 is installed on the Internet 4, for example, by the vendor of the printer 100. The server 200 may be a physical server or may be realized by a program for a server being implemented in a platform.

The server 200 comprises a communication I/F 216 and a controller 230. The units 216 and 230 are connected to a bus line (reference sign omitted). The communication I/F 216 is connected to the Internet 4.

The controller 230 comprises a CPU 232 and a memory 234. The CPU 232 executes various processes according to a program 236 stored in the memory 234. The memory 234 is configured of a volatile memory, a non-volatile memory, etc. The memory 234 stores a first determination table 250 and a service table 254 in addition to the program 236.

(Details of Tables 250, 252; FIG. 2)

With reference to FIG. 2, details of the tables 250, 254 in the memory 234 of the server 200 are described.

The first determination table 250 is used for the server 200 to determine service(s) supported by a printer based on the model name of the printer. In the first determination table 250, a model name of a printer, automatic shipping support information, and flat-rate printing support information are associated with each other. The automatic shipping support information selectively indicates one of "YES", which means an automatic shipping service is supported, and "NO", which means the automatic shipping service is not supported. The flat-rate printing support information selectively indicates one of "YES", which means that a flat-rate printing service is supported and "NO", which means that the flat-rate printing service is not supported. In the present embodiment, the printer having the model name "AAA" supports the automatic shipping service but does not support the flat-rate printing service. A printer having a model name "BBB" does not support the automatic shipping service but supports the flat-rate printing service.

The automatic shipping service is a service of automatically shipping new ink CTG(s) to a user of a printer in response to the remaining amount of ink in the ink CTG(s) currently mounted in the printer reaching a predetermined remaining amount or less. The flat-rate printing service is a service of permitting printing to be executed on sheets up to its maximum quantity within a predetermined time period (e.g., one month) in exchange for payment of a flat-rate fee for the predetermined time period. The flat-rate printing service is also a service of automatically shipping new ink CTG(s) to a user of a printer in response to the remaining amount of ink in the ink CTG(s) currently mounted in the printer reaching a predetermined remaining amount or less. The user needs to enter into contract with the vendor of the printer to use the automatic shipping service or the flat-rate printing service.

The service table 254 is used for the server 200 to manage information related to the services. In the service table 254, a service name, an image URL, a version, image data itself, and a webpage URL are associated with each other. In the present embodiment, the service name selectively indicates one of the automatic shipping service and the flat-rate printing service. The image URL is location information of image data representing a banner image corresponding to the service. The version is the version of the image data. Every time the image data is updated by the vendor of the printer, the version is updated. In the present embodiment, image data with a larger version value is later. The webpage URL is location information of data of webpage screen into which information for receiving the service is inputted.

Figure 3:
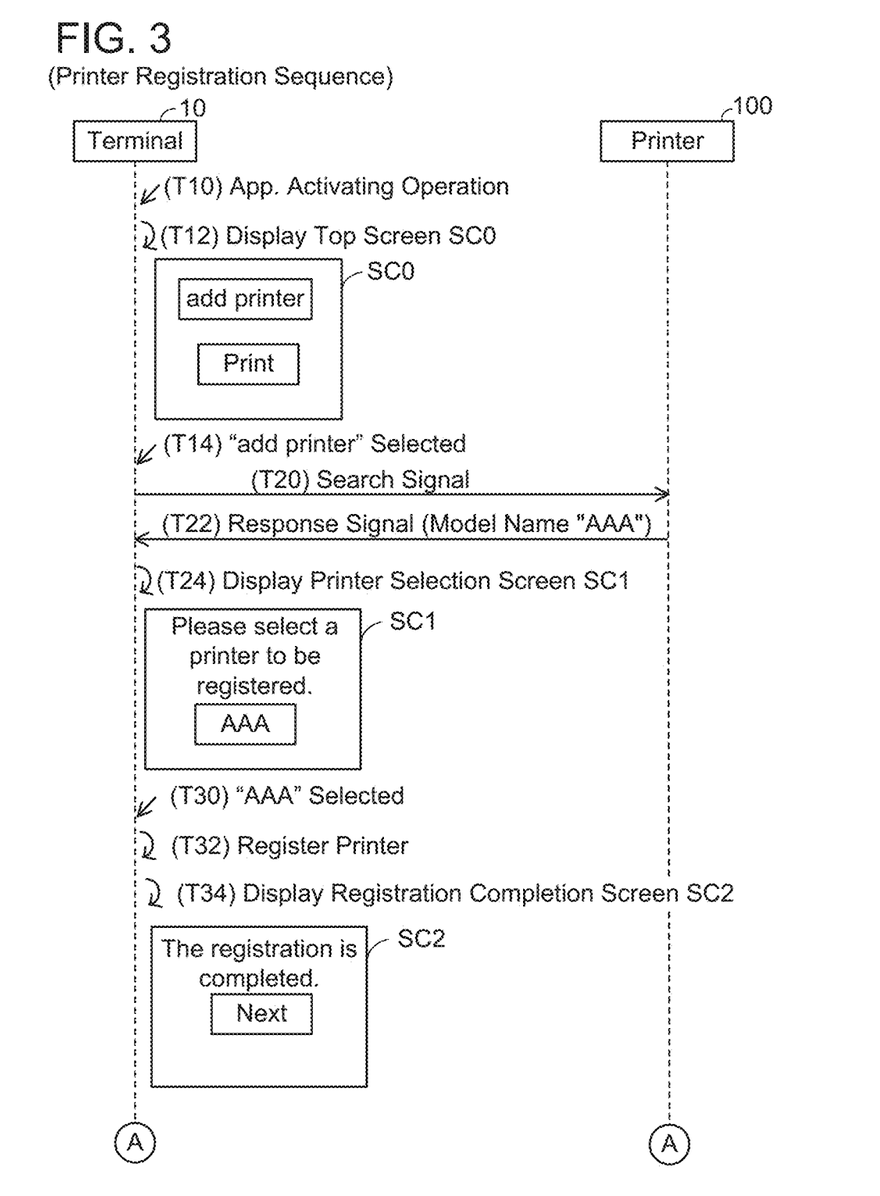
FIG. 3 illustrates a sequence diagram for a process of registering printer-related information to a terminal.

(Printer Registration Sequence: FIG. 3)

With reference to FIG. 3, a process of registering information related to the printer 100 to the terminal 10 is described. For the description in connection with FIG. 3, actions performed by the CPUs (e.g., the CPU 32) of the devices are described with the devices (e.g., the terminal 10, etc.), not the CPUs, as the subjects of actions, for the sake of simplicity in understanding. This is also applied to the description in connection with FIGS. 7 and 8.

In T10, the terminal 10 receives an operation for activating the printer app 50 from the user. The terminal 10 activates the printer app 50 accordingly and executes T12 to T34 according to the printer app 50.

In T12, the terminal 10 displays a top screen SC0 on the display unit 14. The top screen SC0 includes an "add printer" icon, which is a trigger for the registration process. This icon is displayed in case where information of a printer has not been registered in the terminal 10 yet. The top screen SC0 further includes a "print" icon for causing a registered printer to execute printing.

When receiving an operation of selecting the "add printer" icon from the user in T14, the terminal 10 sends a search signal to the AP 6 (see the drawing) by broadcasting in T20. The search signal is a signal for searching for printers connected to the AP6, and in this case, the search signal is received by the printer 100. In T22, the terminal 10 receives a response signal including the model name "AAA" of the printer 100 from the printer 100 via the AP 6. In this instance, the terminal 10 displays a printer selection screen SC1 including the model name "AAA" in the response signal on the display unit 14 in T24.

In T30, the terminal 10 receives an operation of selecting the model name "AAA" included in the printer selection screen SC1 from the user. In this instance, the terminal 10 registers information related to the printer 100 to a storage area in the memory 34 that is assigned to the printer app 50 in T32. This information includes not only the model name "AAA" of the printer 100 but also, for example, an IP address, etc. of the printer 100. Hereinafter, the aforementioned storage area is referred to as "app storage area".

The terminal 10 then displays a registration completion screen SC2 on the display unit 14 in T34. The registration completion screen SC2 includes a message indicating that the registration of the information of the printer 100 has been completed and a Next button.

Figure 4:
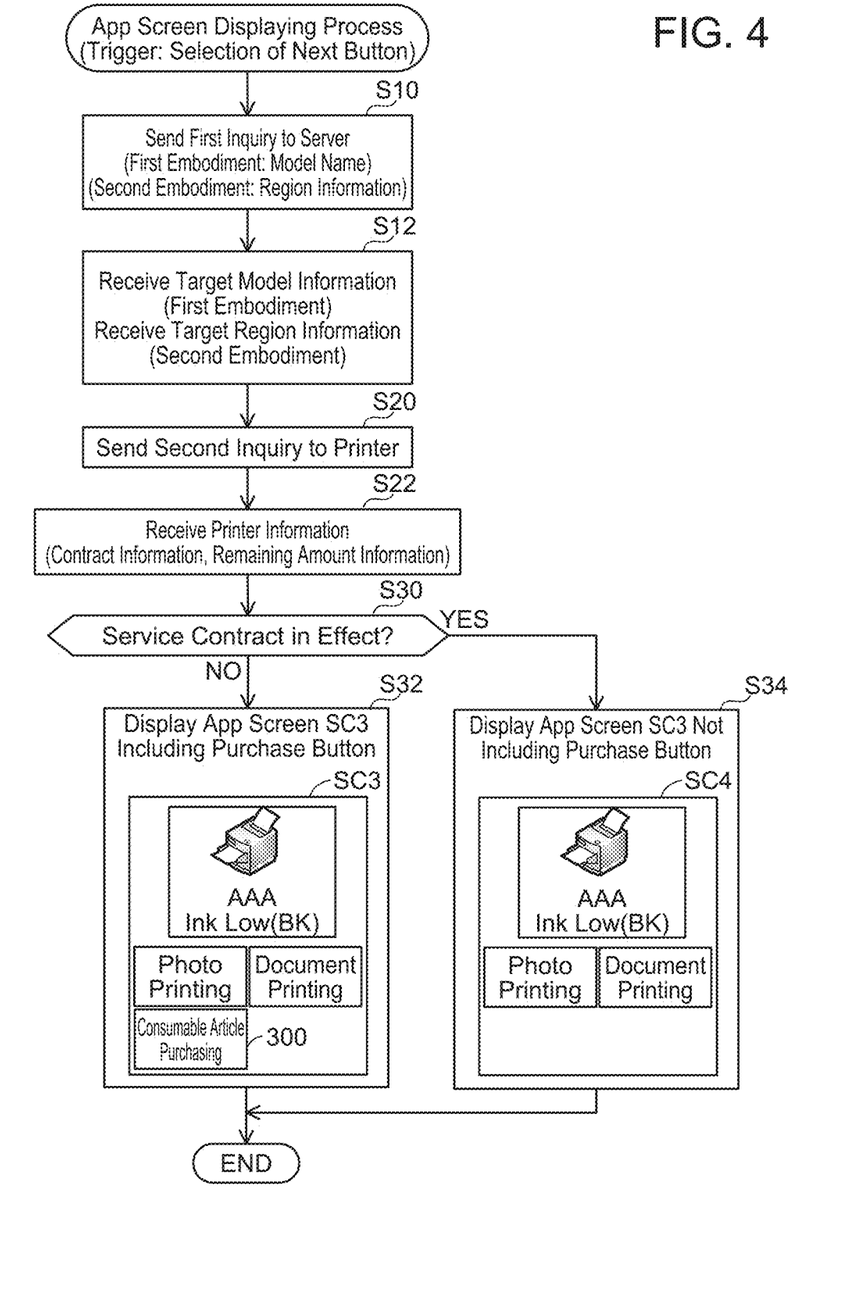
FIG. 4 illustrates a flowchart of application screen displaying process.

(App Screen Displaying Process: FIG. 4)

With reference to FIG. 4, an app screen displaying process executed by the CPU 32 of the terminal 10 according to the printer app 50 is described. The printer app 50 and the browser app 42 control the hardware of the terminal 10 via the OS program 40. Therefore, "the CPU 32 executes a process (e.g., app screen displaying process) according to an app (e.g., printer app 50)" means that the CPU 32 executes the process based on control the CPU 32 receives from the app via the OS program 40. The app screen displaying process is triggered by the Next button in the registration completion screen SC2 (see T34 in FIG. 3) being selected by the user. The following description is made with the printer app 50, not the CPU 32, as the subject of actions. This is also applied to the description in connection with FIG. 5.

In S10, the printer app 50 sends a first inquiry to the server 200. The first inquiry includes the model name of the registered printer (e.g., "AAA" in T32 of FIG. 3). Hereinafter, the model name included in the first inquiry may be referred to as "target model name".

In S12, the printer app 50 receives target model name information, which is a response to the first inquiry, from the server 200. The target model name information includes the automatic shipping support information and flat-rate printing support information that are associated with the target model name in the first determination table 250. If the printer having the target model name supports the automatic shipping service (i.e., if the automatic shipping support information indicates "YES"), the target model name information further includes the various information associated with the automatic shipping service in the service table 254 (e.g., image URL 310, version 2.0, webpage URL 410). However, the target model name information does not include image data itself corresponding the image URL. If the printer having the target model name supports the flat-rate printing service (i.e., if the flat-rate printing support information indicates "YES"), the target model name information further includes the various information associated with the flat-rate printing service in the service table 254 (e.g., image URL 320, version 1.0, webpage URL 420). By sending the model name of the registered printer to the server 200, the printer app 50 can appropriately receive information related to the service(s) supported by the printer from the server 200.

In S20, the printer app 50 sends a second inquiry to the printer with the IP address registered in T32 of FIG. 3 as its destination. Hereinafter, this printer is referred to as "target printer".

In S22, the printer app 50 receives printer information, which is a response to the second inquiry, from the target printer. The printer information includes contract information that indicates whether a contract for the service for the target printer is in effect or not and remaining amount information that indicates ink remaining amounts in ink CTGs of the respective colors currently mounted in the target printer.

In S30, the printer app 50 determines whether the contract is already in effect or not based on the contract information included in the received printer information. When the contract information indicates that the contract is already in effect, the printer app 50 determines YES in S30 and proceeds to S34, whereas when the contract information indicates that the contract is not in effect, the printer app 50 determines NO and proceeds to S32.

In S32, the printer app 50 displays an app screen SC3 including a purchase button 300 on the display unit 14. The app screen SC3 includes an image representing the target printer, the model name of the target printer (e.g., "AAA"), a photo printing button, a text printing button, and the purchase button 300. The photo printing button and the text printing button are buttons for causing the target printer to execute corresponding types of printing. The purchase button 300 is an button for a purchase of ink CTG(s).

If the remaining amount information included in the received printer information indicates that the ink remaining amount in an ink CTG of a certain color is less than a predetermined amount, the app screen SC3 includes a character string that indicates the ink remaining amount of that color is low (e.g., "Ink Low (BK)"). If the remaining amount information indicates that the ink remaining amounts in the ink CTGs of the all colors are equal to or more than the predetermined amount, the app screen SC3 includes a character string that indicates the ink remaining amounts are large enough (e.g., "Ink Enough"). In a modification, the app screen SC3 may include character strings that respectively indicate the ink remaining amounts of the colors themselves or ink remaining amount bars for the respective colors.

In S34, the printer app 50 displays an app screen SC4 which does not include the purchase button 300 on the display unit 14. The app screen SC4 is the same as the app screen SC3 except that the former does not include the purchase button 300. If the contract for the automatic shipping service or the flat-rate printing service is already in effect, ink CTG(s) is automatically shipped. Since the user does not need to perform an act of purchasing ink CTG(s), the purchase button 300 is not displayed. Since the unnecessary button is not displayed, which helps the user see the app screen SC4 more easily.

Figure 5:
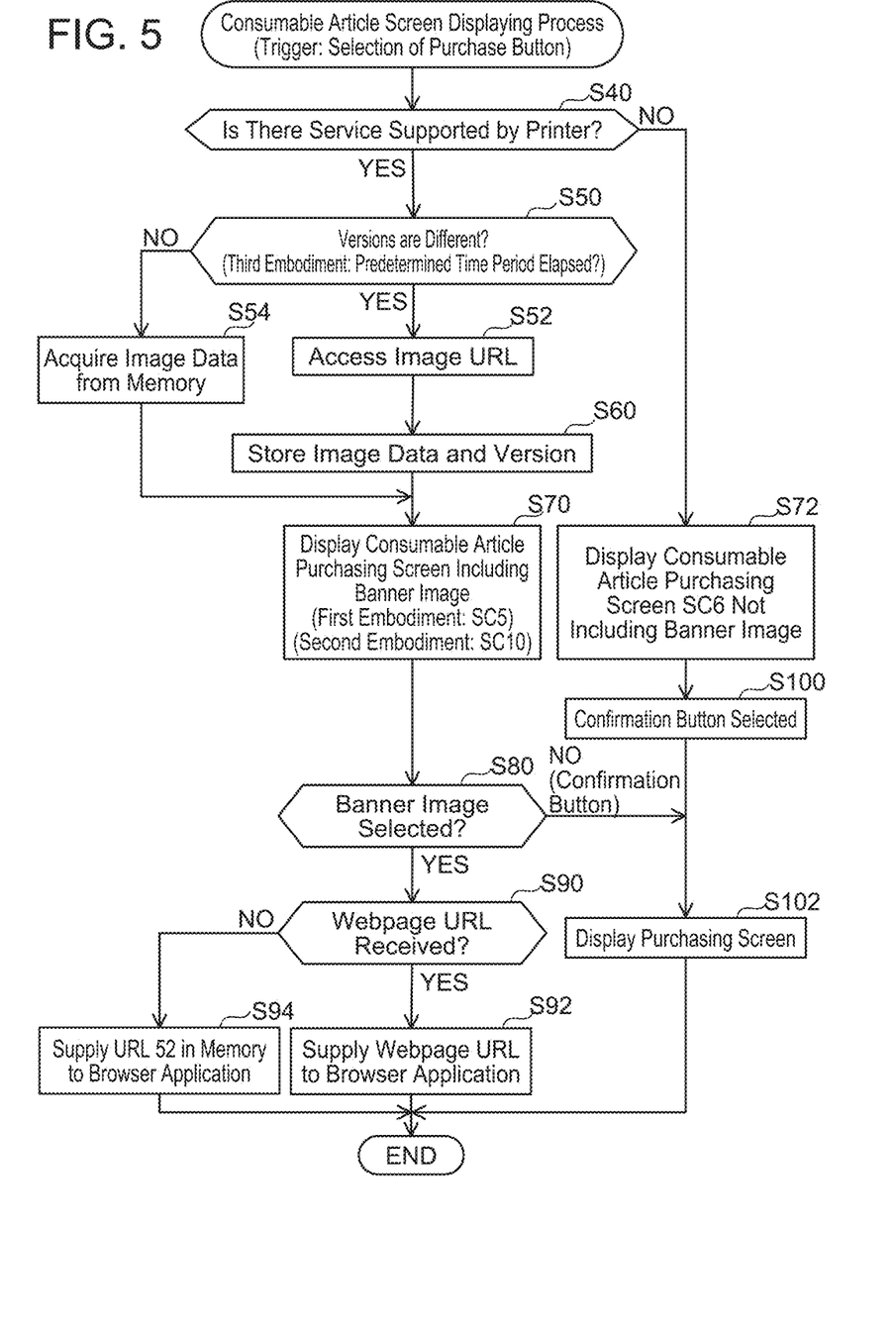
FIG. 5 illustrates a flowchart of consumable article screen displaying process.

(Consumable Article Purchase Screen Displaying Process: FIG. 5)

With reference to FIG. 5, a consumable article purchase screen displaying process executed by the CPU 32 of the terminal 10 according to the printer app 50 is described. The consumable article purchase screen displaying process is triggered by the purchase button 300 in the app screen SC3 (see S32 in FIG. 4) being selected by the user.

In S40, the printer app 50 determines whether there is a service the target printer supports. When the target model information received in S12 of FIG. 4 includes at least one of the automatic shipping support information "YES" and the flat-rate printing support information "YES", the printer app 50 determines YES in S40 and proceeds to S50. When the target model information includes the automatic shipping support information "NO" and the flat-rate printing support information "NO", the printer app 50 determines NO in S40 and proceeds to S72.

In S50, the printer app 50 compares the version included in the target model information received in S12 of FIG. 4 with the version stored in the app storage area. When the former version is different from the latter version, the printer app 50 determines YES in S50 and proceeds to S52, whereas when the former version is the same as the latter version, the printer app 50 determines NO in S50 and proceeds to S54. When there is no version stored in the app storage area, the printer app 50 determines YES in S50.

In S52, the printer app 50 accesses the image URL (e.g., image URL 310) included in the target model information. As a result, the printer app 50 receives image data (e.g., image data D1) corresponding to the image URL from the server 200.

In S60, the printer app 50 then stores the received image data and version to the app storage area.

On the other hand, when determining NO in S50, the printer app 50 acquires image data from the app storage area in S54 and proceeds to S70.

In S70, the printer app 50 displays, on the display unit 14, a consumable article purchase screen SC5 including a banner image represented by the image data acquired in S52 or S54. Thus, the printer app 50 can display the consumable article purchase screen SC5 including the banner image of the latest version on the display unit 14.

Figure 6:
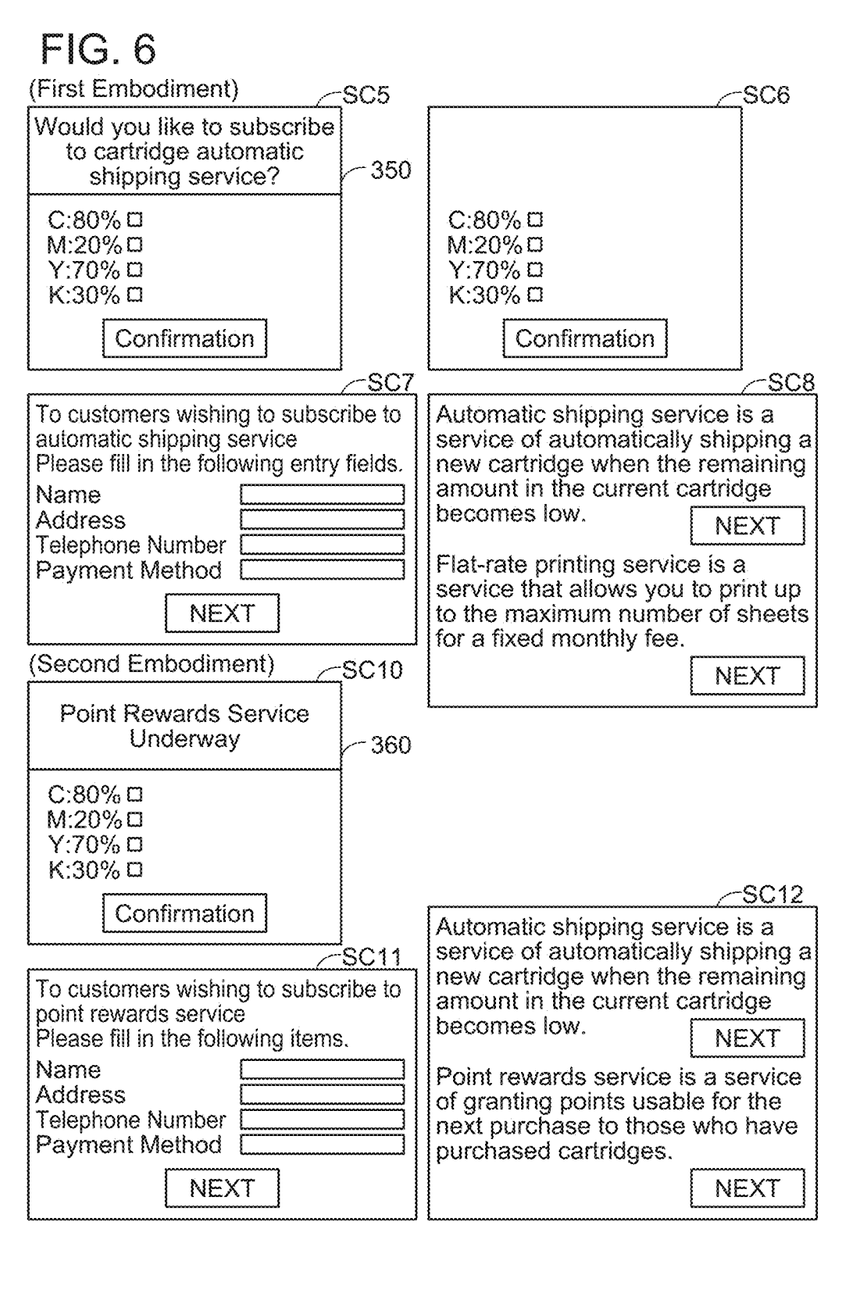
FIG. 6 illustrates screens displayed at the terminal.

As illustrated in FIG. 6, the consumable article purchase screen SC5 includes a banner image 350 represented by the image data acquired in S52 or S54. The banner image 350 includes a character string "Would you like to subscribe to cartridge automatic shipping service?" that prompts subscription to the automatic shipping service. Thus, the printer app 50 can prompt the user to subscribe to the automatic shipping service. The user is able to know that there is the automatic shipping service. Further, since the consumable article purchase screen SC5 including the banner image 350 is displayed, the user can more easily know that there is the automatic shipping service as compared with a configuration in which the banner image 350 is displayed in a separate screen.

The consumable article purchase screen SC5 further includes four checkboxes corresponding to CMYK. Thus, the user can select ink CTG(s) to be purchased. The consumable article purchase screen SC5 further includes the remaining amount information included in the printer information received in S22 of FIG. 4. Thus, the user can consider which ink CTG(s) (which color(s)) should be purchased based on the remaining amount information.

In S80, the printer app 50 determines whether the banner image 350 in the consumable article purchase screen SC5 is selected by the user or a confirmation button in the consumable article purchase screen SC5 is selected by the user. When the banner image 350 is selected, the printer app 50 determines YES in S80 and proceeds to S90. When the confirmation button is selected after one or more colors have been selected, the printer app 50 determines NO in S80 and proceeds to S102.

In S90, the printer app 50 determines whether a webpage URL has been received. If the target model information received in S12 of FIG. 4 includes a webpage URL, the printer app 50 determines YES in S90 and proceeds to S92, whereas if the target model information does not include a webpage URL, the printer app 50 determines NO in S90 and proceeds to S94.

In S92, the printer app 50 supplies the webpage URL to the browser app 42. As a result, the browser app 42 accesses the webpage URL and displays a first service screen SC7 on the display unit 14.

As illustrated in FIG. 6, the first service screen SC7 includes a message that prompts to fill in entry fields for items required to subscribe to the service supported by the target printer (e.g., the automatic shipping service in the example of FIG. 6), entry fields for the required items, and a Next button. The required items include, for example, a name, address, phone number, and payment method (e.g., credit card number). When the Next button is selected after the entry fields for the required items have been filled in by the user, the entered information is sent to the server 200. In this way, the contract for the service becomes in effect.

In S94, the printer app 50 supplies the URL 52 stored in the app storage area to the browser app 42. The browser app 42 accesses the URL 52 and displays a second service screen SC8 on the display unit 14. As illustrated in FIG. 6, the second service screen SC8 includes a character string "Automatic shipping service is a service of automatically shipping a new cartridge when the remaining amount in the current cartridge becomes low", which indicates contents of the automatic shipping service provided by the vendor of the printer, a character string "Flat-rate printing service is a service that allows you to print up to the maximum number of sheets for a fixed monthly fee", which indicates contents of the flat-rate printing service, and Next buttons for the services. Thus, the user is able to know the contents of the respective services. As above, the printer app 50 can display the second service screen SC8 on the display unit 14 by using the URL 52 incorporated in the printer app 50 in advance, even without receiving a webpage URL from the server 200 (NO in S90 of FIG. 5). The process of FIG. 5 ends when S92 or S94 is completed.

When one of the Next buttons is selected by the user, i.e., when one of the services is selected by the user, the browser app 42 sends a webpage request corresponding to the selected service to the server 200 and then receives webpage data that represents a webpage including detailed information on the service from the server 200. The browser app 42 then displays the webpage on the display unit 14.

In S72, the printer app 50 displays a consumable article purchase screen SC6 which does not include a banner image on the display unit 14. As illustrated in FIG. 6, the consumable article purchase screen SC6 is the same as the consumable article purchase screen SC5 except that the former does not include the banner image 350. Since the target printer does not support any services, a banner image that prompts subscription to a service is not displayed. Therefore, provision of unnecessary information to the user can be suppressed.

In S100, the printer app 50 receives selection of the confirmation button from the user after one or more colors have been selected.

In S102, the printer app 50 displays a purchase screen (not illustrated) for purchasing ink CTG(s) of the selected color(s). By entering, for example, a name, an address, etc. to the purchase screen, the user can purchase the ink CTG(s).

Figure 7:
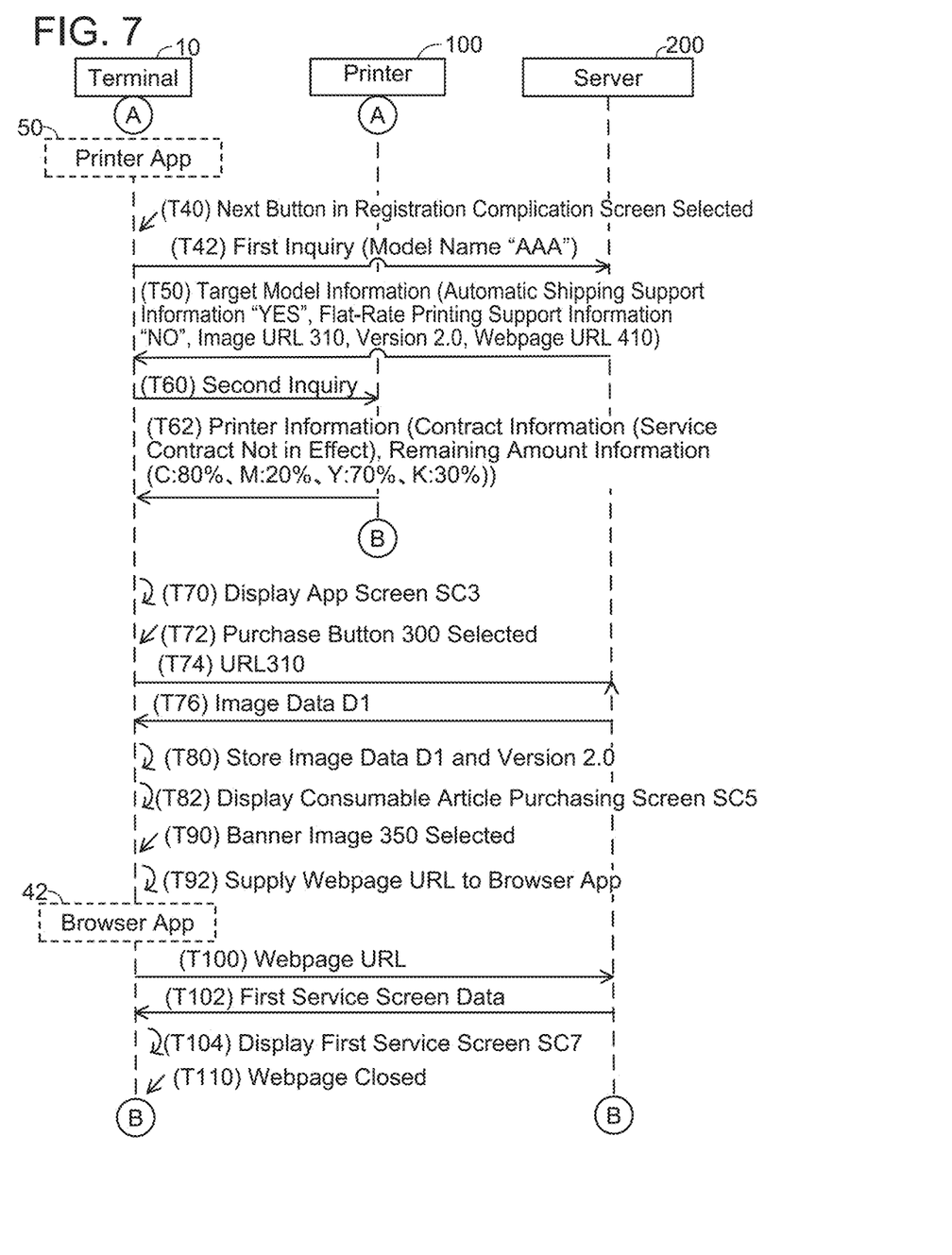
FIG. 7 illustrates a sequence diagram for a specific case.
Figure 8:
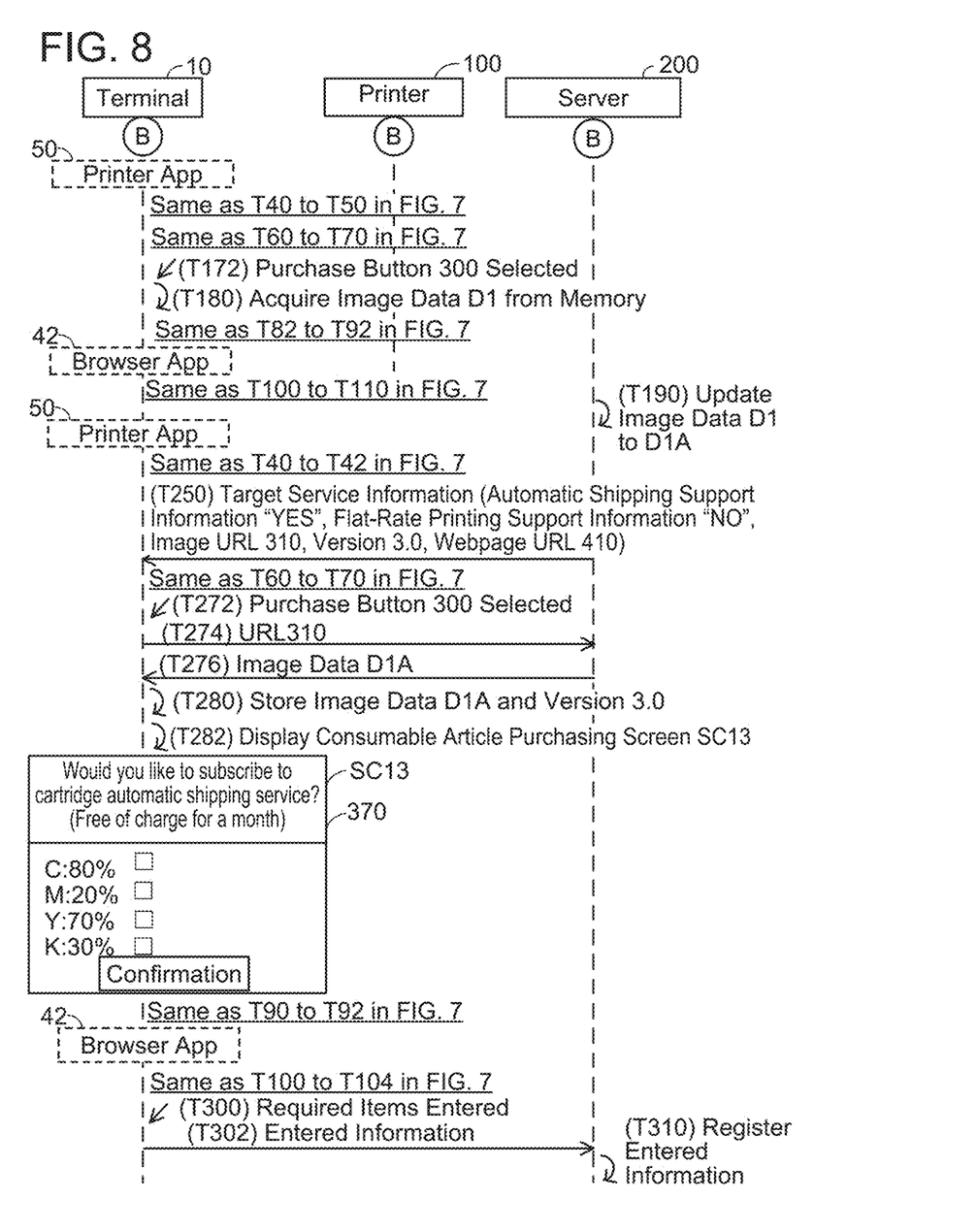
FIG. 8 illustrates a sequence diagram continued from FIG. 7.

(Specific Case: FIG. 7 and FIG. 8)

With reference to FIGS. 7 and 8, a specific case realized through the processes of FIGS. 4 and 5 is described. The sequence of FIG. 7 is continued from the sequence of FIG. 3.

The terminal 10 executes T40 to T92 according to the printer app 50. In T40, the terminal 10 receives the selection of the Next button in the registration completion screen SC2 from the user (which is the trigger for the process of FIG. 4). In this instance, in T42, the terminal 10 sends the server 200 a first inquiry that includes the model name "AAA" already registered in the app storage area in T32 of FIG. 3 (S10).

When receiving the first inquiry from the terminal 10 in T42, the server 200 sends target model information to the terminal 10 in T50. This target model information includes the automatic shipping service support information "YES" and the flat-rate printing service support information "NO" which are associated with the model name "AAA" in the first determination table 250. This target model information further includes the image URL 310, version 2.0, and webpage URL 410 which are associated with the automatic shipping service in the service table 254. The target model information does not include image data D1.

When receiving the target model data from the server 200 in T50 (S12), the terminal 10 sends a second inquiry to the printer 100 in T60 (S20).

When receiving the second inquiry from the terminal 10 in T60, the printer 100 sends printer information to the terminal 10 in T62. This printer information includes contract information and remaining amount information of the printer 100. In the present case, the contract for the automatic shipping service is not yet in effect at the timepoint of T60. Therefore, the contract information indicates that the contract for the service is not yet in effect.

When receiving the printer information in T62, the terminal 10 displays the app screen SC3 including the purchase button 300 in T70 (NO in S30, S32). In T72, the terminal 10 receives the selection of the purchase button 300 in the app screen SC3 (which is the trigger for the process of FIG. 5). In this instance, the terminal 10 accesses the image URL 310 included in the target model information in T74 (YES in S40, YES in S50, S52) and receives image data D1 corresponding to the image URL 310 from the server 200 in T76.

The terminal 10 then stores the image data D1 and version 2.0 included in the target model information in the app storage area in T80 (S60). In T82, the terminal 10 displays the consumable article purchase screen SC5 (S70). As illustrated in FIG. 6, the consumable article purchase screen SC5 includes the banner image 350 represented by the image data D1. The terminal 10 receives the selection of the banner image 350 in T90 (YES in S80) and then supplies the webpage URL 410 to the browser app 42 in T92 (YES in S90, S92).

T100 and onward are executed by the browser app 42. The terminal 10 accesses the webpage URL 410 in T100 and then receives first service screen data from the server 200 in T102. The terminal 10 displays the first service screen SC7 in T104. After that, when receiving an instruction to close the webpage from the user in T110, the terminal 10 terminates the display of the first service screen SC7.

(Continuation from FIG. 7: FIG. 8)

After the process of FIG. 7 has been executed, the same sequence as the sequence from T40 to T50 of FIG. 7 is executed between the terminal 10 and the server 200. Then, the same sequence as the sequence from T60 to T70 of FIG. 7 is executed between the terminal 10 and the printer 100. In T172, the terminal 10 re-receives the selection of the purchase button 300 from the user (which is the trigger for the process of FIG. 5).

The target model information received in T50 of FIG. 7 referenced in FIG. 8 includes the automatic shipping service information "YES" (YES in S40) and version 2.0. Further, at the timepoint of T172, the image data D1 and version 2.0 have already been stored in the app storage area (see T80 in FIG. 7). Therefore, version 2.0 included in the target model information matches version 2.0 stored in the app storage area (NO in S50). In this instance, the terminal 10 acquires the image data D1 from the app storage area in T180 (S54). After that, the terminal 10 executes the same sequence as the sequence from T82 to T92 in FIG. 7 according to the printer app 50 and executes the same sequence as the sequence from T100 to T110 in FIG. 7 according to the browser app 42.

In T190, the server 200 receives an instruction to update the image data D1 from the administrator of the server 200. As a result, the image data corresponding to the image URL 310 in the memory 234 is updated from the image data D1 to image data D1A. The image data D1A has version 3.0.

Then, the same sequence as the sequence from T40 to T42 in FIG. 7 is executed. When receiving a first inquiry from the terminal 10 in T42, the server 200 sends target model information to the terminal 10 in T250. This target model information includes version 3.0 of the updated image data D1A.

When receiving the target model information from the server 200 in T250 (S12), the terminal 10 executes the same sequence as the sequence from T60 to T70 in FIG. 7. In T272, the terminal 10 re-receives the selection of the purchase button 300 from the user (which is the trigger for the process of FIG. 5). In this instance, the terminal 10 determines that version 3.0 included in the target model information is different from version 2.0 stored in the app storage area (YES in S50), accesses the image URL 310 in T274 (S52), and receives the image data D1A from the server 200 in T276.

In T280, the terminal 10 stores the image data D1A and version 3.0 in the app storage area instead of the image data D1 and version 2.0 (S60). In T282, the terminal 10 displays a consumable article purchase screen SC13 including a banner image 370 represented by the image data D1A (S70). The banner image 370 includes a character string "Free of charge for a month" indicating that there is a promotion that the automatic shipping service can be used for free for a month, in addition to the character string that prompts subscription to the cartridge automatic shipping service. As above, the terminal 10 can receive the image data D1A representing the latest banner image 370 from the server 200 and display the banner 370.

After that, the terminal 10 executes the same sequence as the sequence from T90 to T92 in FIG. 7 according to the printer app 50 and executes the same sequence as the sequence from T100 to T104 in FIG. 7 according to the browser app 42. T300 and onward are executed by the browser app 42. In T300, the terminal 10 receives the entry of information for each required item in the first service screen SC7 from the user. In this instance, the terminal 10 sends the entered information to the server 200 in T302.

When receiving the information from the terminal 10 in T302, the server 200 registers the information in the memory 234 in T310. In this way, the user can enter into contract for the automatic shipping service with the vendor of the printer 100.

Effects of Present Embodiment

When receiving the selection of the purchase button 300 for a purchase of ink CTG(s) for the printer 100 (which is the trigger for the process of FIG. 5), the terminal 10 displays the banner image 350 (S70). Therefore, the user is able to know the information related to the automatic shipping service provided by the vendor of the printer 100. Thus, the terminal 10 can provide the useful information to the user of the printer 100.

(Correspondence Relationships)

The printer app 50 of the terminal 10 is an example of "computer-readable instructions for a terminal device". The printer 100 and the app screen SC3 are examples of "printing device" and "predetermined screen", respectively. The ink CTGs of four colors are each an example of "consumable article". The selection of the purchase button 300 is an example of "operation on the object". The selection of the purchase button 300 by the user is an example of "predetermined instruction". The model name "AAA" is an example of "model identifier".

The automatic shipping service and the flat-rate printing service are examples of "service provided by a vendor of the printing device". The banner image 350 is an example of "service-related information". A character string "automatic shipping" included in the banner image 350 is an example of "character string indicating a content of the service". A character string "Would you like to subscribe to cartridge automatic shipping service?" included in the banner image 350 is an example of "character string that prompts the user to enter into the contract". The image data D1 and the image data D1A are examples of "first data" and "second data", respectively. The webpage URL 410 and the webpage URL 52 are examples of "first location information" and "second location information", respectively. Version 3.0 is an example of "update information". The checkbox for the color C and the checkbox for the color M are examples of "first image" and "second image", respectively. The ink is an example of "color material".

S32 in FIG. 4, S70 in FIG. 5, T282 in FIG. 8, and T82 in FIG. 8 cited from FIG. 7 are examples of "display a predetermined screen related to a printing device on a display unit of the terminal device", "display service-related information related to a service provided by a vendor of the printing device on the display unit", "display the updated service-related information indicated by the received second data on the display unit", and "display the service-related information indicated by the first data stored in the memory on the display unit", respectively. S52 in FIG. 5, T276 in FIG. 8, and S22 in FIG. 4 are examples of "receive first data indicating the service-related information from a server", "receive second data indicating updated service-related information from the server", "receive remaining amount information indicating a remaining amount of a color material contained in a color material cartridge mounted in the printing device from the printing device", respectively. S60 in FIG. 5 is an example of "store the received first data in a memory of the terminal device".

SECOND EMBODIMENT

The user designates a region in which the terminal 10 is used (e.g., Japan, US, Europe, etc.) in the initial setting for the terminal 10. Thus, as illustrated in FIG. 2, the memory 34 stores region information "XXX" indicating the region designated by the user.

Further, in the present embodiment, the memory 234 of the server 200 stores a second determination table 252 instead of the first determination table 250. The second determination table 252 is used to determine what services are provided in each region indicated by corresponding region information. In the second determination table 252, region information, automatic shipping provision information, and point rewards provision information are associated with each other. The automatic shipping provision information selectively indicates one of "YES", which means that the automatic shipping service is provided in the region indicated by the region information, and "NO", which means that the automatic shipping service is not provided in the region. The point rewards provision information selectively indicates one of "YES", which means that a point rewards service is provided in the region indicated by the region information, and "NO", which means that the point rewards service is not provided in the region. In the present embodiment, the service table 254 stores information related to the point rewards service.

The point rewards service is a service of granting purchasers points in response to their purchases of goods related to the printer 100 (e.g., ink CTGs). The user can purchase the goods by the points.

With reference to FIG. 4, an app screen displaying process according to the present embodiment is described. In S10, the printer app 50 sends the server 200 a first inquiry that includes region information (e.g., "XXX") stored in the memory 34 instead of the target model name. Hereinafter, the region information included in the first inquiry and the region indicated by the region information may be referred to as "target region information" and "target region", respectively.

In S12, the printer app 50 receives target region-related information, which is a response to the first inquiry, from the server 200. The target region-related information includes the automatic shipping provision information and point reward provision information that are associated with the target region information in the second determination table 252. If the automatic shipping service is provided in the target region (i.e., if the automatic shipping provision information indicates "YES"), the target region-related information further includes information associated with the automatic shipping service in the service table 254 (e.g., image URL 310, version 2.0, webpage URL 410). If the point rewards service is provided in the target region (i.e., if the point rewards provision information indicates "YES"), the target region-related information further includes information associated with the point rewards service in the service table 254 (e.g., image URL 330, version 1.0, webpage URL 430). In this way, the printer app 50 can appropriately receive information related to the service(s) provided in the target region in response to sending the region information indicating the target region to the server 200.

In S70 of FIG. 5, the printer app 50 displays a consumable article purchase screen SC10 on the display unit 14, instead of the consumable article purchasing screen SC5. As illustrated in FIG. 6, the consumable article purchasing screen SC10 includes a banner image 360 instead of the banner image 350. The banner image 360 includes a character string "Point Rewards Service Underway" to inform the user that there is the point rewards service. Therefore, the user is able to know that points are granted.

When the printer app 50 supplies the webpage URL to the browser app 42 in S92 of FIG. 5, the browser app 42 displays a third service screen SC11 on the display unit 14 instead of the first service screen SC7. As illustrated in FIG. 6, the third service screen SC11 includes a message that prompts to fill in entry fields for items required to subscribe to the point rewards service, entry fields for the required items, and a Next button. When the Next button is selected after the entry fields for the required items are filled in by the user, the entered information is sent to the server 200. As a result, the user can use the point rewards service. The point rewards service in the present embodiment does not require a contract with the vendor of the printer 100 for the user to use it. In a modification, the point rewards service may become available to the user by contract with the vendor.

In the present embodiment, the printer app 50 supplies the URL 52 stored in the app storage area to the browser app 42 in S94 of FIG. 5, the browser app 42 displays a fourth service screen SC12 on the display unit 14 instead of the second service screen SC8. As illustrated in FIG. 6, the fourth service screen SC12 includes character strings respectively indicating contents of the automatic shipping service and the point rewards service, and Next buttons for the services. These Next buttons are, as with the Next buttons in the second service screen SC8, for displaying webpages related to the services on the display unit 14.

THIRD EMBODIMENT

In S50 of FIG. 5, the printer app 50 determines whether a predetermined time period has elapsed since image data was stored in the app storage area, instead of comparing versions. This predetermined time period is a time period during which the banner image is expected to be updated, and is, for example, 6 months. When determining that the predetermined time period has elapsed since image data was stored in the app storage area, the printer app 50 determines YES in S50 and proceeds to S52. In this instance, the printer app 50 displays the banner image represented by image data received from the server 200 on the display unit 14 in S70. Thus, the terminal 10 can display the latest banner image.

On the other hand, when determining that the predetermined time period has not elapsed yet since image data was stored in the app storage area, the printer app 50 determines NO in S50 and proceeds to S54. In this instance, the printer app 50 displays the banner image represented by the image data stored in the app storage area on the display unit 14 in S70. As above, the terminal 10 does not communicate image data with the server before the predetermined time period elapses, which can reduce communication load. In the present embodiment, displaying the banner image represented by the image data stored in the app storage area in S70 is an example of "display the service-related information stored in the memory on the display unit".

While specific examples of the present disclosure have been described above in detail, these examples are merely illustrative and place no limitation on the scope of the patent claims. The technology described in the patent claims also encompasses various changes and modifications to the specific examples described above. Modifications of the above embodiments are described below.

Modification 1

The terminal 10 may receive, for example, a voice instruction for purchasing ink CTG(s) from the user, instead of the selection of the purchase button 300. In this modification, the voice instruction is an example of "predetermined instruction".

Modification 2

The banner image 350 may include, for example, a graphic that represents the automatic shipping service, instead of the character string. Generally speaking, the "service-related information" may not include the character string indicating the contents of the service.

Modification 3

S30 in FIG. 4 may be omitted. That is, the printer app 50 may display the app screen SC3 including the purchase button on the display unit 14 regardless of whether the contract for the service for the target printer is in effect or not.

Modification 4

S52 in FIG. 5 may be omitted. In S70, the printer app 50 may display, on the display unit 14, a consumable article purchasing screen that includes a banner image represented by image data stored in advance in the app storage area. In this modification, "receive first data indicating the service-related information from a server" may be omitted.

Modification 5

The target model information may necessarily include a webpage URL or may not necessarily include a webpage URL. In this modification, S90 in FIG. 5 may be omitted. Generally speaking, the first location information may be necessarily received from the server or may not be necessarily received from the server.

Modification 6

Image data representing a banner image may not be updated. In this instance, once the printer app 50 has stored image data received from the server 200 in the app storage area, the printer app 50 can acquire the image data from the app storage area and display it thereafter. In another modification, the server 200 may change the image URL in response to updating image data. In this instance, the terminal 10 may receive the changed image URL, instead of the updated image data D1A, from the server 200. In this modification, "receive second data indicating updated service-related information from the server" and "display the updated service-related information indicated by the received second data on the display unit" may be omitted.

Modification 7

In S10, the printer app 50 may send the server 200 a first inquiry that includes a version stored in the app storage area. In this instance, the server 200 may compare the received version with the current version and determine whether the image data has been updated. The server 200 may send result information indicating a result of the determination to the terminal 10. When the receives result information indicates that the image data has been updated, the terminal 10 determines YES in S50 of FIG. 5, whereas when the received result information indicates that the image data has not been updated, the terminal 10 determines NO in S50. In this modification, the result information indicating that the image data has been updated is an example of "update information".

Modification 8

The consumable article purchasing screen SC5 may not include the banner image 350. For example, the banner image 350 may be displayed on the display unit 14 in a screen different from the consumable article purchasing screen SC5. Generally speaking, the "consumable article purchasing screen" may not include the service-related information.

Modification 9

The consumable article purchasing screen SC5 may not include the four checkboxes for a purchase of ink CTGs corresponding to the four colors CMYK. Generally speaking, the "consumable article purchase screen" may not include the "first image" or the "second image".

Modification 10

The terminal 10 may not receive the remaining amount information from the printer 100. In this instance, the consumable article purchasing screen SC5 does not include the remaining amount information. In this modification, "receive remaining amount information indicating a remaining amount of a color material contained in a color material cartridge mounted in the printing device from the printing device" may be omitted.

Modification 11

The "consumable article" is not limited to an ink CTG but may be paper for printing, a roller, etc.

Modification 12

In the above embodiments, the processes of FIGS. 3 to 8 are implemented by software (e.g., the printer app 50), however, at least one of these processes may be implemented by hardware such as a logic circuit, etc.

What is claimed is:

1. A non-transitory computer-readable recording medium storing computer-readable instructions for a terminal device, the computer-readable instructions, when executed by a processor of the terminal device, causing the terminal device to:
　in a case where a user of a printing device has not entered into a contract related to a service, display a predetermined screen related to the printing device on a display unit of the terminal device, the predetermined screen including an object for purchasing a consumable article for the printing device; and
　in a case where a user operation is received on the object of the predetermined screen, display service-related information related to the service.

2. The non-transitory computer-readable recording medium as in claim 1, wherein
　the service-related information includes a character string indicating a content of the service.

3. The non-transitory computer-readable recording medium as in claim 1, wherein
　the service becomes available to the user by the contract with a vendor, and
　the service-related information includes a character string that prompts the user to enter into the contract.

4. The non-transitory computer-readable recording medium as in claim 1, wherein
　in a case where the user has entered into the contract with a vendor, the predetermined screen does not include the object.

5. The non-transitory computer-readable recording medium as in claim 1, wherein
　the service is a service of granting a benefit to the user in response to a purchase of the consumable article, and
　the service-related information includes a character string that notifies the user of grant of the benefit.

6. The non-transitory computer-readable recording medium as in claim 1, wherein
　the computer-readable instructions, when executed by the processor, further cause the terminal device to receive first data indicating the service-related information from a server, and
　the service-related information indicated by the received first data is displayed on the display unit.

7. The non-transitory computer-readable recording medium as in claim 6, wherein
　the computer-readable instructions, when executed by the processor, further cause the terminal device to:
　in a case where the first data and first location information are received from the server and the service-related information displayed on the display unit is selected by the user, execute a first display process for displaying a first service-related screen related to the service using the first location information; and
　in a case where the first data is received from the server without receiving the first location information and the service-related information displayed on the display unit is selected by the user, execute a second display process for displaying a second service-related screen related to the service using second location information prestored in the non-transitory computer-readable recording medium, wherein the second service-related screen is different from the first service-related screen.

8. The non-transitory computer-readable recording medium as in claim 6, wherein
　the server stores plural pieces of service-related information related to a plurality of services provided by a vendor, and
　a model identifier indicating a model of the printing device is sent to the server so as to receive the first data that is related to a service supported by the model indicated by the model identifier among the plural pieces of service-related information.

9. The non-transitory computer-readable recording medium as in claim 6, wherein
　the server stores plural pieces of service-related information related to a plurality of services provided by a vendor, and
　region information indicating a region where the terminal device is used is sent to the server so as to receive the first data that is related to a service provided in the region indicated by the region information among the plural pieces of service-related information.

10. The non-transitory computer-readable recording medium as in claim 6, wherein
　the computer-readable instructions, when executed by the processor, further cause the terminal device to:
　in a case where the service-related information is updated in the server after the service-related information has been displayed on the display unit and the user operation is re-received on the object of the predetermined screen, receive second data indicating updated service-related information from the server; and
　display the updated service-related information indicated by the received second data on the display unit.

11. The non-transitory computer-readable recording medium as in claim 10, wherein
　the computer-readable instructions, when executed by the processor, further cause the terminal device to, in a case where the first data is received from the server, store the received first data in a memory of the terminal device,
　in a case where update information indicating that the service-related information has been updated is received from the server after the service-related information has been displayed on the display unit and the user operation is re-received on the object of the predetermined screen,
　　the second data is received from the server, and
　　the updated service-related information indicated by the received second data is displayed on the display unit, and
　the computer-readable instructions, when executed by the processor, further cause the terminal device to, in a case where the user operation is re-received on the object of the predetermined screen without receiving the update information from the server after the service-related information has been displayed on the display unit, display the service-related information indicated by the first data stored in the memory on the display unit.

12. The non-transitory computer-readable recording medium as in claim 10, wherein
　the computer-readable instructions, when executed by the processor, further cause the terminal device to:

in a case where the first data is received from the server, store the service-related information indicated by the received first data in a memory of the terminal device; and in a case where the user operation is re-received on the object of the predetermined screen before a predetermined time period elapses from when the service-related information was stored in the memory of the terminal device, display the service-related information stored in the memory on the display unit, and in a case where the user operation is re-received on the object of the predetermined screen after the predetermined time period has elapsed from when the service-related information was stored in the memory of the terminal device, the second data is received from the server.

13. The non-transitory computer-readable recording medium as in claim 1, wherein
in a case where the user operation is received on the object of the predetermined screen, a consumable article purchasing screen for purchasing the consumable article is displayed on the display unit, wherein the consumable article purchasing screen includes the service-related information.

14. The non-transitory computer-readable recording medium as in claim 13, wherein
the consumable article purchasing screen includes a first image for selecting a purchase of a first consumable article and a second image for selecting a purchase of a second consumable article different from the first consumable article.

15. The non-transitory computer-readable recording medium as in claim 13, wherein
the consumable article is a color material cartridge containing a color material,
the computer-readable instructions, when executed by the processor, further cause the terminal device to receive remaining amount information indicating a remaining amount of a color material contained in a color material cartridge mounted in the printing device from the printing device, and
the consumable article purchasing screen includes the received remaining amount information.

16. The non-transitory computer-readable recording medium as in claim 1, wherein the computer-readable instructions, when executed by the processor, further cause the terminal device to in a case where the user of the printing device has already entered into the contract related to the service, display another screen related to the printing device on the display unit of the terminal device, the another screen not including the object.

17. The non-transitory computer-readable recording medium as in claim 1, wherein
the service includes an automatic shipping service for the consumable article of the printing device, and
the computer-readable instructions, when executed by the processor, further cause the terminal device to in a case where the user of the printing device has already entered into the contract related to the service, display another screen related to the printing device on the display unit of the terminal device, the another screen not including the object.

18. A terminal device comprising:
a display unit; and
a controller configured to in a case where a user of a printing device has not entered into a contract related to a service,
display a predetermined screen related to the printing device on the display unit, the predetermined screen including an object for purchasing a consumable article for the printing device; and
in a case where a user operation is received on the object of the predetermined screen, display service-related information related to the service.

19. A method for controlling a terminal device, the method comprising:
in a case where a user of a printing device has not entered into a contract related to a service, displaying a predetermined screen related to the printing device on a display unit of the terminal device, the predetermined screen including an object for purchasing a consumable article for the printing device; and
in a case where a user operation is received on the object of the predetermined screen, displaying service-related information related to the service.

20. The method as in claim 19, wherein:
the service-related information includes a character string indicating a content of the service.

* * * * *